(12) United States Patent
Keinänen et al.

(10) Patent No.: US 9,351,120 B2
(45) Date of Patent: May 24, 2016

(54) CREATING A DATABASE ENTRY (75) Inventors: Anne Keinänen, Jokirinne (FI); Virve Inget, Oulu (FI); Anna-Maija Ohlsson, Turku (FI); Jennica Falk, Rødovre (DK); Tiiu Koort-Fallström, Valkeakoski (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/112,160

(22) PCT Filed: Apr. 17, 2012

(86) PCT No.: PCT/IB2012/051908
§ 371 (c)(1),
(2), (4) Date: Jan. 2, 2014

(87) PCT Pub. No.: WO2012/143849
PCT Pub. Date: Oct. 26, 2012

(65) Prior Publication Data
US 2014/0106780 A1    Apr. 17, 2014

(30) Foreign Application Priority Data
Apr. 18, 2011 (GB) .................................. 1106531.5

(51) Int. Cl.
H04W 4/02 (2009.01)
H04M 1/725 (2006.01)
G06F 17/30 (2006.01)
(Continued)

(52) U.S. Cl.
CPC ......... *H04W 4/025* (2013.01); *G06F 17/30528* (2013.01); *H04M 1/7253* (2013.01); *H04M 1/72572* (2013.01); *H04W 4/023* (2013.01); *H04W 4/028* (2013.01); *G06Q 10/109* (2013.01);
(Continued)

(58) Field of Classification Search
CPC . H04M 1/7253; H04W 4/025; H04W 72/048; H04W 8/22; G06Q 20/237; G06F 3/0481; H04L 67/12
USPC ............. 455/456.1, 456.3; 715/781; 380/258; 235/380
See application file for complete search history.

(56) References Cited

U.S. PATENT DOCUMENTS 7,212,827 B1    5/2007 Veschl
2007/0190494 A1* 8/2007 Rosenberg ...................... 434/11
(Continued)

FOREIGN PATENT DOCUMENTS

EP    1 802 145 A1    6/2007
GB    2 368 498 A     5/2002
(Continued)

OTHER PUBLICATIONS

International Search Report and Written Opinion for Application No. PCT/IB2012/051908 dated Sep. 11, 2012.
(Continued)

*Primary Examiner* — Phuoc H Doan
(74) *Attorney, Agent, or Firm* — Alston & Bird LLP (57) ABSTRACT

A method comprises determining when a first portable device and a second portable device have been at a same current location for longer than a predetermined duration, and subsequent to determining that the first and second portable devices, have been at the same current location for longer than the predetermined duration, creating a database entry associated with the first portable device, the database entry including information identifying the second portable device.

28 Claims, 4 Drawing Sheets

(51) Int. Cl.
*H04W 4/18* (2009.01)
*G06Q 10/10* (2012.01)
*H04W 4/20* (2009.01)

(52) U.S. Cl.
CPC ........... *H04M 2250/64* (2013.01); *H04W 4/185* (2013.01); *H04W 4/20* (2013.01)

(56) References Cited

U.S. PATENT DOCUMENTS

| | | | |
|---|---|---|---|
| 2007/0281690 | A1 | 12/2007 | Altman et al. |
| 2008/0070593 | A1 | 3/2008 | Altman et al. |
| 2009/0115617 | A1 | 5/2009 | Sano et al. |
| 2009/0143079 | A1* | 6/2009 | Klassen et al. ............. 455/456.3 |
| 2009/0248807 | A1 | 10/2009 | Fron et al. |
| 2010/0151883 | A1 | 6/2010 | Soundararajan |
| 2010/0205242 | A1 | 8/2010 | Marchioro, II et al. |
| 2010/0217672 | A1 | 8/2010 | Maeno |

FOREIGN PATENT DOCUMENTS

| | | |
|---|---|---|
| JP | 2007 172422 A | 7/2007 |
| JP | 2010 128634 A | 6/2010 |
| WO | WO 00/22860 A1 | 4/2000 |
| WO | WO 2007/112057 A1 | 10/2007 |
| WO | WO 2008/070593 A2 | 6/2008 |
| WO | WO 2008/134595 A1 | 11/2008 |
| WO | WO 2010/053371 A1 | 5/2010 |

OTHER PUBLICATIONS

Supplementary European Search Report for Application No. EP 12 77 4078 dated Sep. 30, 2014.
Search Report for Great Britain Application No. GB 1106531.5 dated Aug. 17, 2011.

\* cited by examiner

CREATING A DATABASE ENTRY

FIELD OF THE INVENTION

The invention relates to creating a database entry.

BACKGROUND

Portable electronic devices are often used as diaries to enable users to keep track of future appointments and to keep records of past events.

SUMMARY OF THE INVENTION

According to a first aspect, this specification describes a method comprising determining when a first portable device and a second portable device have been at a same current location for longer than a predetermined duration, and subsequent to determining that the first and second portable devices have been at the same current location for longer than the predetermined duration, creating a database entry associated with the first portable device, the database entry including information identifying the second portable device.

According to a second aspect, this specification describes computer-readable instructions which, when executed by at least one processor, cause the at least one processor perform methods according the first aspect.

According to a third aspect, this specification describes apparatus comprising at least one processor, and at least one memory having computer-readable instructions stored thereon, the computer-readable instructions, when executed by the at least one processor, causing the at least one processor to determine when a first portable device and a second portable device have been at a same current location for longer than a predetermined duration, and subsequent to determining that the first and second portable devices have been at the same current location for longer than the predetermined duration, to create a database entry associated with the first portable device, the database entry including information identifying the second portable device.

According to a fourth aspect, this specification describes apparatus comprising means for determining when a first portable device and a second portable device have been at a same current location for longer than a predetermined duration, and means for creating a database entry in response to determining that the first and second portable devices have been at the same current location for longer than a predetermined duration, the database entry being associated with the first portable device, the database entry including information identifying the second portable device.

The apparatus may comprise means for causing a graphical representation of at least part of information in the database entry to be displayed on a display of the first portable device. The apparatus may further comprise means for causing the graphical representation to be displayed while the first and second portable devices remain at the same location, and means for causing the graphical representation to be removed from the display when it is determined that the first portable device and the second portable device have moved to different locations. The apparatus may comprise means for including additional information in the database entry, and means for causing an additional graphical representation to be displayed on the display based on the additional information. The graphical representation may comprise a link to a content item associated with the information with which the representation is associated, and apparatus may comprise means for responding to user selection, via the first portable device, of the link by causing the content item to be provided to the user of the first portable device.

The apparatus may comprise means for obtaining information, while the first and second portable devices remain at the same location, the obtained information relating to one or more content items associated with the current location, and means for including information identifying the one or more content items in the database entry.

The apparatus may comprise means for determining a current date and means for associating the database entry with the current date.

The apparatus may comprise means for determining, based on an identifier associated with the second portable device and one or more reference device identifiers, whether or not the database entry is to be created, and means for creating the database entry only in response to a positive determination.

The apparatus may comprise means for determining, based on an identifier associated with the same current location and one or more reference location identifiers, whether or not the database entry is to be created, and means for creating the database entry only in response to a positive determination.

The apparatus may comprise means for determining that the first and second portable devices are in the same location in response to detecting that a short-range interaction has occurred between the first and second portable devices.

Alternatively, the apparatus may comprise means for repeatedly determining a current location of a first portable device, means for repeatedly determining a current location of a second portable device, and means for creating the database entry only when it is determined that the first and second device have been at the same current location for longer than a predetermined duration.

According to a fifth aspect, this specification describes at least one non-transitory memory medium, having computer-readable code stored thereon, the computer readable code being configured to cause at least one processor to determine when a first portable device and a second portable device have been at a same current location for longer than a predetermined duration, and subsequent to determining that the first and second portable devices have been at the same current location for longer than the predetermined duration, to create a database entry associated with the first portable device, the database entry including information identifying the second portable device.

According to a sixth aspect, this specification describes apparatus configured to cause at least one processor to determine when a first portable device and a second portable device have been at a same current location for longer than a predetermined duration, and subsequent to determining that the first and second portable devices have been at the same current location for longer than the predetermined duration, to create a database entry associated with the first portable device, the database entry including information identifying the second portable device.

BRIEF DESCRIPTION OF THE DRAWINGS

For a more complete understanding of example embodiments of the present invention, reference is now made to the following description taken in connection with the accompanying drawings in which.

DETAILED DESCRIPTION OF THE EMBODIMENTS

In the description and drawings, like reference numerals refer to like elements throughout.

Figures 1, 2:
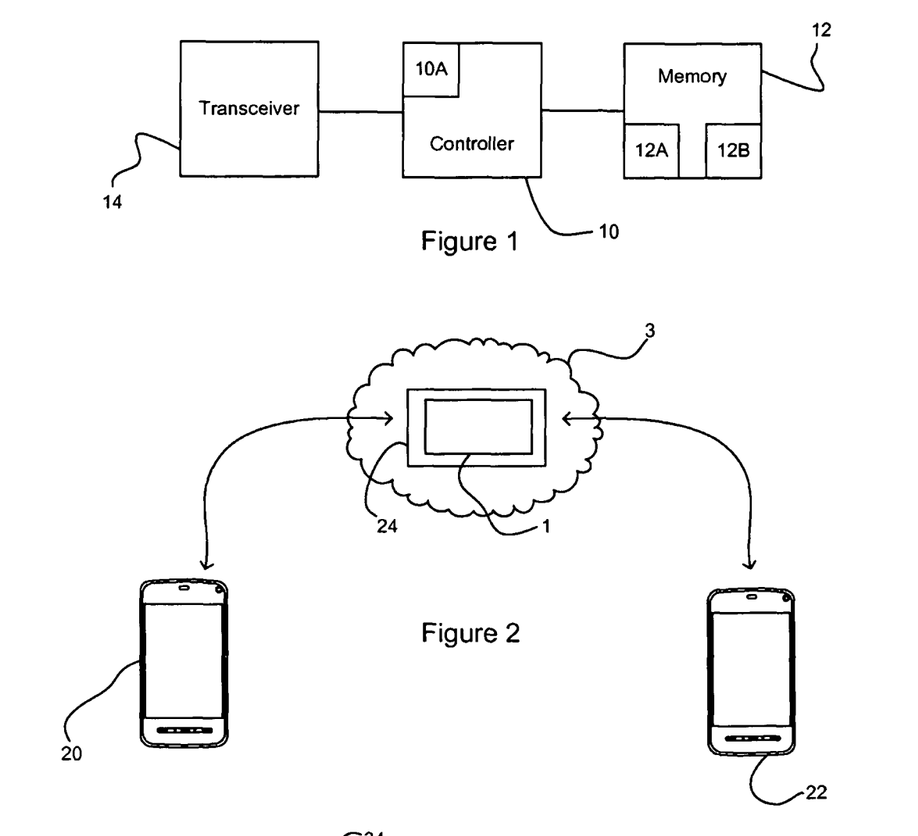
FIG. 1 is a schematic illustration of apparatus according to example embodiments of the invention.
FIG. 2 is a schematic illustration of an example communication system in which apparatus according to example embodiments of the invention may be provided.

FIG. 1 is a schematic illustration of apparatus 1 according to example embodiments of the invention. The apparatus 1 is operable automatically to create records relating to currently occurring events. The apparatus 1 comprises a controller 10 and at least one memory 12. In the example of FIG. 1, the apparatus 1 also comprises a transceiver 14. The controller 10 is operable, under the control of computer-readable instructions 12A stored in the memory 12, to perform operations and to control the other components of the apparatus 1. As such, the controller 10 is operable to retrieve data from the memory 12 and also to cause data to be stored in the memory 12. The controller 10 is operable also to send data signals to the transceiver 14 and to cause the data signals to be transmitted by the transceiver 14. The controller is 10 also operable to process data signals received by the transceiver 14.

The controller 10 comprises at least one processor 10A, which is operable to execute the computer-readable 12A instructions stored in the memory 12. The at least one processor 10A may comprise any combination of different types of processor, microprocessor or other type of processing means. The controller 10 may also comprise one or more application specific integrated circuits (ASICS) (not shown in FIG. 1).

The at least one memory 12 comprises a portion 12B for storing records relating to events. This portion is hereafter referred to as the event database 12B.

The transceiver 14 is operable, under the control of the controller 10, to transmit data signals, either directly or indirectly to other apparatuses and devices. The transceiver 14 may comprise more than one different transceiver module and may operate using more than one different transmission protocol. For example, the transceiver 14 may be operable to send wireless data signals using GPRS or another suitable type of wireless transmission protocol. Similarly, the transceiver 14 may be operable to communicate with other apparatus and devices via Bluetooth or another type of short-range transmission protocol.

FIG. 2 shows a communication system 2 in which the apparatus 1 of FIG. 1 may reside. The system 2 comprises the apparatus 1 of FIG. 1, and first and second portable devices 20, 22. The apparatus 1 is operable to participate in two-way communication when each of the first and second portable devices 20, 22. In this example, the apparatus 1 is part of a server apparatus 24 located in a network 3, such as "the cloud". It will be appreciated that the apparatus 1 may be distributed over various different physical entities which may be at different locations within the network 3. The first and second portable devices may comprise, but are not limited to mobile telephones, personal digital assistants, tablet computers, e-readers, and audio players.

Figure 3:
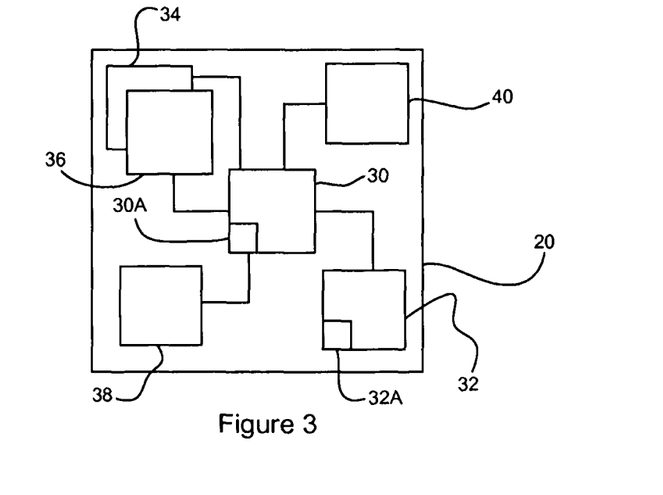
FIG. 3 is a schematic illustration of an example of a portable device as shown in the communication system of FIG. 2.

FIG. 3 is a schematic illustration of the first portable 20 device depicted in FIG. 2. The portable device 20 comprises a controller 30 and at least one memory 32. The controller 30 comprises at least one processor 30A which is operable under the control of computer-readable instructions 32A stored in the at least one memory 32 to perform operations and to control the other components of the portable device 20. The portable device 20 also comprises a display 34 which is operable under the control of the controller 30 to display images for consumption by a user of the portable device 20. The portable device 20 also comprises a user interface 36. The user interface 36 is operable to receive user inputs and send signals indicative thereof to the controller 30. The controller 10 is responsive to receipt of these signals to control the other components of the portable device 20. In this example, the user interface 36 comprises a touch-sensitive transducer, which is overlaid on the display 34 to form a touchscreen 34, 36. It will be appreciated that the user interface 36 may alternatively, in other example embodiments, comprise a different type of user interface 36, such as, but not limited to mechanicals keys, a scroll wheel, a track ball and a voice recognition user interface.

The portable device 20 also comprises at least one transceiver 40, which may be substantially the same as the transceiver 14 of FIG. 1. The transceiver 40 is operable to send signals to and receive signals from the apparatus 1 of FIG. 1. The transceiver 40 is operable also to communicate directly or indirectly with the second portable device 22. As such, the transceiver 40 may be operable to send signals via a cellular data network to the second portable device 22. Also, the transceiver 40 may be operable to communicate directly with the second portable device 22 via a short range wireless protocol including Bluetooth and NFC. The portable device 20 may also comprise a location module 38, such as a GPS module, for determining the current location of the portable device 20. The controller 30 of the portable device 20 is operable to send signals indicative of the current location of the portable device 20, which may have been calculated by the location module, to the server apparatus 24. In some embodiments, the server apparatus 24 may receive signals relating to the locations of the first and second devices from entities other than the devices themselves. For example, the location information may instead be received from a cellular network operator with which a device is associated.

The location of the first portable device 20 may be determined using any suitable method. These methods may include, for example but not limited to, using GPS, using locations of one or more wireless local area network (WLAN) routers which have the device within their communications range, using a location of one or more picocells which have the device within their communications range and using a location of one or more base stations which have the device within their communication range. It will be appreciated that the location of the device may alternatively be determined using another method, or using any combination of methods.

The server apparatus 24 is operable to cause instruction signals to be transmitted to the first portable device 20. The controller 30 of the first portable device 20 may be responsive to receipt of the instruction signals to control the other components of the portable device 20 based thereon. For example, the portable device 20 may receive instruction signals from the server apparatus 24 and, in response, may cause images to be displayed on the display 34.

The second portable device 22 may be comprised similarly to the first portable device 20 as described with reference to FIG. 3. The second portable device 22 device may be configured to transmit location signals to the server apparatus 24. The server apparatus 24 may be responsive to location signals received from the first and second portable devices 20, 22 to determine their respective locations. In some alternative embodiments, the server apparatus 24 may be operable to determine the locations of the first and second portable devices 20, 22 in some other manner. For example, the server apparatus 24 may determine the location of the first and second portable devices 20, 22 based on a location of one or more base station to which they are most proximate, or based on a wireless network to which they are currently connected.

Figure 4:
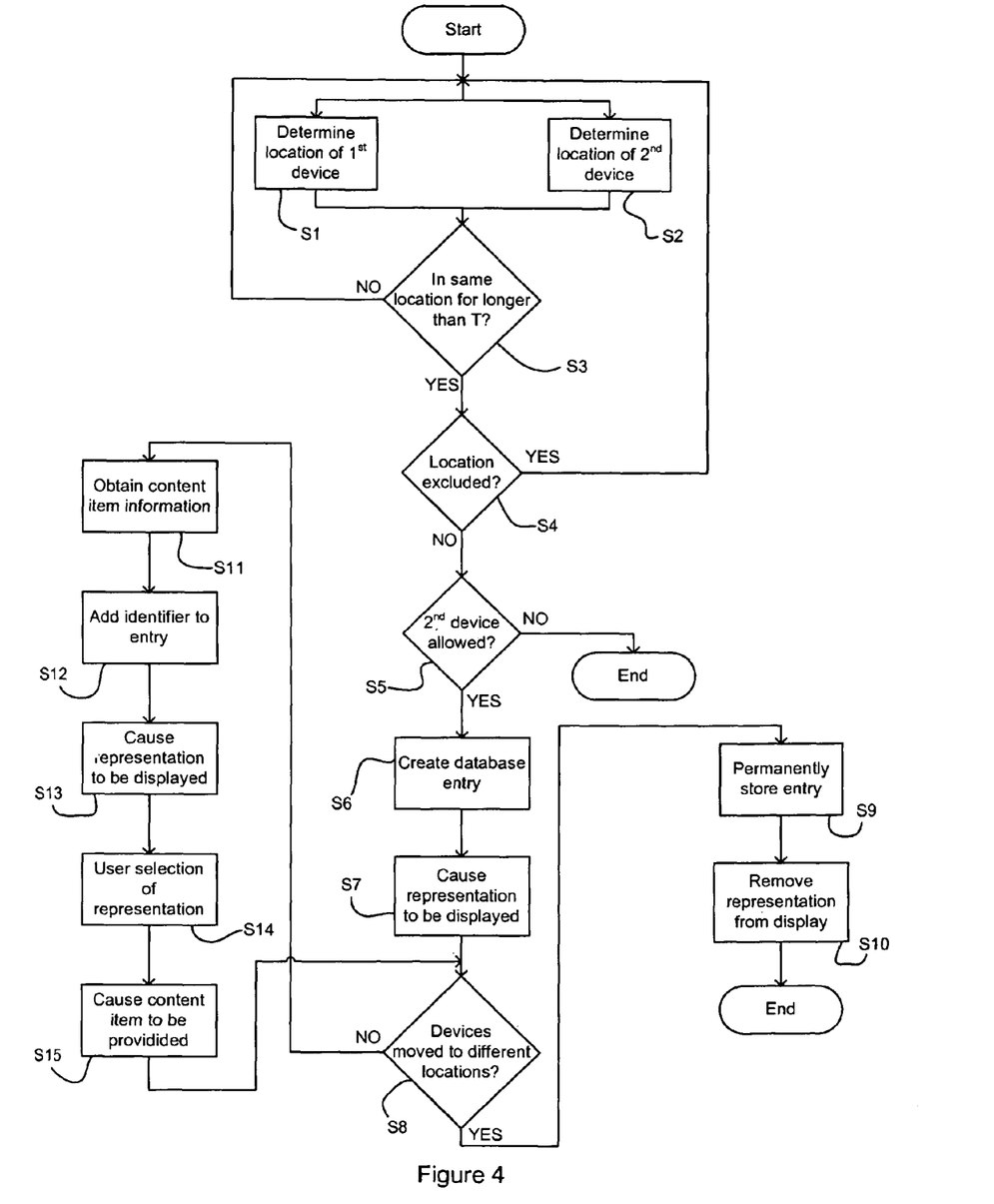
FIG. 4 is a flow chart illustrating a method according to example embodiments of the invention.

FIG. 4 is a flow chart illustrating a method according to example embodiments of the invention. The method may be carried out by the controller 10 of the apparatus 1 of FIG. 1 under the control of the computable-readable instructions 12A stored in the memory 12.

In step S1, the controller 10 repeatedly determines the location of the first portable device 20. This may be determined, for example, using location signals, including for example GPS location information, received from the first portable device 20. In other examples, this may be determined by identifying a picocell or WLAN router with which the device is in communication or is within range of. In some embodiments, the location of the device may be determined using any combination of different methods. The controller 10 may be operable to determine the location of the first portable device 20 periodically, for example every 5 minutes.

At the same time, in step S2, the controller 10 repeatedly determines the location of the second portable device 22. This may be determined as described with reference to step S1. Similarly to step S1, this may be determined periodically, for example every 5 minutes.

Next, in step S3 the controller 10 determines whether the first and second portable devices 20, 22 have been in the same location for longer than a predetermined duration. This predetermined duration may comprise for example 5, 10, 15 or 30 minutes or any other suitable duration. This may prevent devices being detected as being in the same location, when such is only transitory or very short-lived.

The first and second devices 20, 22 may be determined to be in the same location when a particular criterion is met. In some examples, the criterion may be that the separation between the two devices is less than a pre-determined threshold. The threshold may be, for example, 2 meters (e.g. sitting at the same table), 10 meters (e.g. in the same room or building), or 50 meters (e.g. in the same park). The separation threshold may be dependent on the resolution of the method used to determine the location of the devices. In some examples, such as when the location is determined using WLANs or picocells, the criterion may simply be that both devices are within the range of the same WLAN or are in the communication range of the same picocell.

If, in step S3, it is determined that the first and second portable devices 20, 22 have been in the same current location for longer than the predetermined duration, the method moves to step S4. If, however, the determination of step S3 results in a negative outcome, the method returns to steps S1 and S2.

In step S4, the controller 10 determines if the current location is an excluded location. An excluded location is a location at which a database entry is not to be automatically created. A user of the first portable device 20 may specify one or more excluded locations. In such examples, the controller 10 determines whether the current location is an excluded location by comparing the current location with the one or more specified excluded locations. If the current location is the same as one of the excluded locations, the controller 10 determines that the current location is excluded. For example, a user of the first device 20 may want database entries to be created only when the current location is a location at which they do not reside very often. As such, the user may specify their home and work addresses as excluded locations. In this way, database event entries are not created when the user is at those locations. In alternative embodiments, the controller 10 may be operable automatically to identify locations which the user visits most frequently may automatically specify these locations as excluded locations.

If, in step S4, it is determined that the current location is excluded, the method returns to steps S1 and S2. If, however, it is determined that the current location is not excluded, the method proceeds to step S5.

In step S5, the controller 10 determines if the second portable device 22 is an allowed device. In other words, the controller 10 determines whether it is allowed to create an event database entry in relation to which the second portable device 22. As such, the controller 10 may determine whether the second portable device 22, or a user thereof, is specified in an allowed device list. The allowed device list may be specified by the user of the first device 20. For example, the user may specify only the devices 22 of their friends as being allowed. As such, if the controller 10 determines that an identifier associated with the second portable device 22 is present on the allowed list, a positive determination is reached. If an identifier associated with the second device 22 is not present on the allowed list, a negative determination is reached. In alternative embodiments, the user may specify one or more devices in relation to which they do not want a database entry created. In such examples, the controller 10 reaches a negative determination in step S4 if the second device 22 has not been specified by the user. The controller 10 reaches a positive determination in step S4 if an identifier associated with the second device 22 has been specified by the user.

According to other alternative embodiments, excluded portable devices may be specified automatically by the controller 10. For example, the controller 10 may determine which device, or devices, is geographically is in the same location as the first portable device 20 most frequently. In this way, the controller may be configured such that database entries are not created when the first device is in the same location as a device of a person with whom they frequently spend time (such as their partner).

If a positive determination is reached in step S5, the method proceeds to step S6. If a negative determination is reached, the method ends.

In step S6, the controller 10 creates a new event database entry in the event database 12B. The event database entry comprises one or more information elements. The new event database entry is associated with the first portable device 20. For example, the database may be reserved solely for the storage of records of events at which the first portable device is present. In this way all entries in the database are associated with the first device. Alternatively, the database entry may be associated with the first portable device 20 by way of an included information element which identifies the first portable device 20.

The new database entry includes an information element identifying the second portable device. This information element may comprise for example a telephone or serial number which identifies the device itself. Alternatively, the information may comprise an identifier associated with the user of the device 22, thereby indirectly identifying the second portable device 22. The database entry is an automatically created record of a meeting between the user of the first device 20 and a user associated with the second portable device 22.

The database entry may also include an information element identifying the current location. This may include for example GPS coordinates and/or address information. Consequently, the database entry may be an automatically generated record which specifies the parties to the meeting as well as the location of the meeting.

The database entry may also include a timestamp identifying a time at which the first and second devices are at the same location. The timestamp may represent, for example, the first time at which the two devices were both at the location. In such examples, the controller 10, prior to step S3, stores a timestamp identifying the time at which the first and second portable devices 20, 22 arrived at the same location. A timestamp comprises a data item which identifies a current date and, optionally, the current time. It will thus be understood that embodiments of the invention provide the automatic generation of a record of the people participating in a meeting, the location of the meeting and the time of which the meeting takes place.

Subsequent to step S6, the method proceeds to step S7. In step S7, the controller 10 causes an instruction signal to be sent via the transceiver 14 to the first portable device 20. The instruction signal includes at least one information element from the event database entry. Once received, the instruction signal causes the controller 30 of the first portable device 20 to cause one or more graphical representations, based on one or more information elements included in the signal, to be to be displayed on the display 34.

Figure 5A:
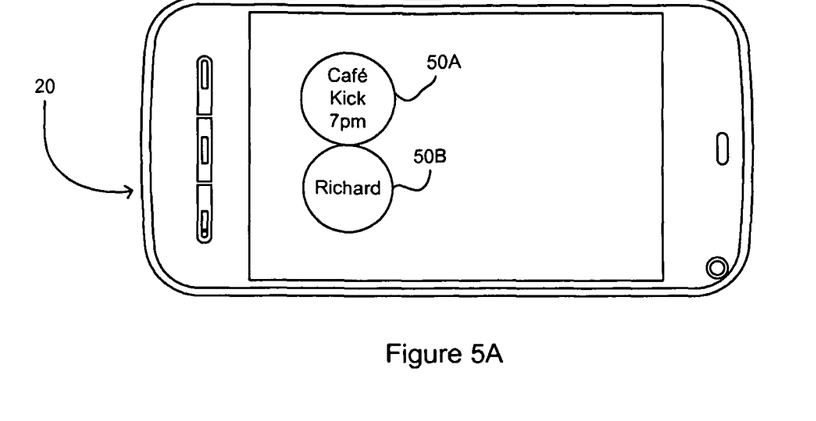
FIGS. 5A to 5C are examples of a display screen at various stages throughout the method of FIG. 4.

FIG. 5A shows an example of two graphical representations 50A, 50B displayed on the display 34. In this example, the graphical representations 50A, 50B comprise icons, which convey at least one of the information elements to the user of the device 20. As such, a first of the graphical representations 50A is an icon indicating the current location, which in this example is "Café Kick". A second of the graphical representations 50B is an icon indicating that the user of the second portable device, which is in this example "Richard". In this example, the first graphical representation 50A also indicates the time at which the user of the first device and the user of the second device were both present at the same location. It will be appreciated that the graphical representations 50A, 50B may take any suitable form as long as they convey information from the database entry, to the user of the first device 20. In some examples, the first graphical representation 50A may comprise a thumbnail image of a map of the location. Similarly, the second graphical representation 50B may comprise thumbnail image of the user of the second device 22. The graphical representations may be stored at, or retrieved by, the first portable device 20. In such embodiments, the controller 30 of the first portable device 20 may use an identifier provided in the instruction signal to identify an appropriate representation. In other examples, the data required by the first portable device 20 to generate and display the graphical representation, or representations, may be included in the instruction signal.

In some examples, one or more of the representations 50A, 50B comprise a link to content associated with the representation. For example, the graphical representation 50A which conveys the current location may comprise a link to a map of the area which includes the current location. Alternatively or additionally, the representation 50A may comprise a link to an internet resource, such as a website, which is associated with the location. Similarly, the representation 50B identifying the user of the second portable device 22 may comprise a link to contact information associated with that user. In such examples, the controller 30 of the first portable device 20 may be responsive to receipt of a user input, via the user interface 36, in respect of a one of the graphical representations 50A, 50B to display content associated with the selected representation 50A, 50B.

Next, the method proceeds to step S8, in which the controller 10 of the server apparatus 24 determines if the first and second devices 20, 22 have moved to separate locations.

If it is determined that the first and second portable devices have moved to separate locations, the method proceeds to step S9 in which the database entry is permanently stored. Next, in step S10 the controller 10 sends an instruction signal to the portable device 20, which causes the controller 30 of the first portable device 20 to remove the one or more graphical representations 50A, 50B from the display 34.

If, in step S8, it is determined that the first and second portable devices 20, 22 are still at the same current location, the method proceeds to step S11.

In step S11, the controller 10 receives an indication that an action in respect of a content item has been performed by either of the first and second devices 20, 22. Examples of such content items include photographs, websites, audio clips, videos, notes. Example of actions in respect of the content items include, but are not limited to, creating, capturing, accessing, downloading, tagging, sending and receiving.

In step S12, the controller 10 responds to receipt of the signal indicating the action in respect of the content item by adding to the event database entry an information element comprising an identifier of the content item. The identifier allows the content item to be identified. The identifier may comprise for example a file name (in examples in which the content item is a photograph) or a URL (in examples in which the content item is a website). It will be appreciated that the identifier may comprise anything suitable for allowing the first portable device 20 to access the content item. In some embodiments, the identifier may comprise the content item itself. A timestamp may also be added to the database entry in association with the content item identifier. The timestamp may indicate, for example, the time at which the action in respect of the content item occurred.

Subsequent to adding the content item identifier to the event database entry, the method proceeds to step S13. In step S13, the controller 10 of the server apparatus 1 causes an instruction signal to be sent to the first portable device 20. The instruction signal may include the content item identifier and the associated timestamp. The instruction signal is for causing a graphical representation, based on the content item identifier, to be added to the display 34. As described with reference to step S7, the graphical representation may comprise a thumbnail image, an icon or any graphical indicator which conveys information about the content item to the user.

Figure 5B:
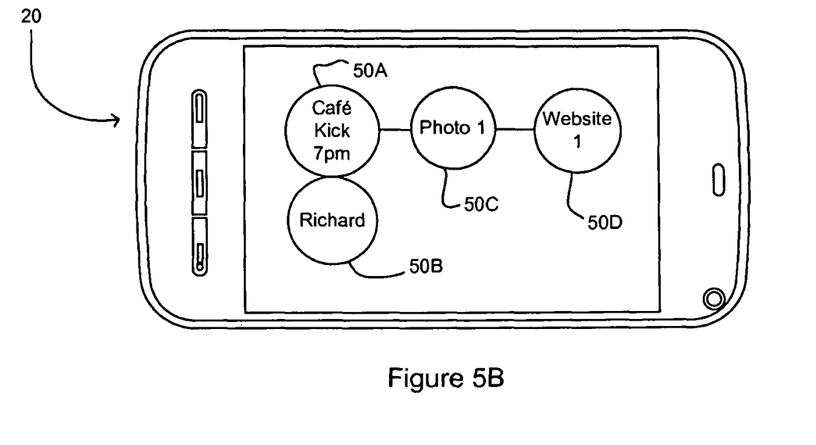

FIG. 5B shows two graphical representations 50C, 50D of content items displayed on the display in addition to the first and second representations 50A, 50B. In the example of FIG. 5B, the representations 50D, 50C identify a photograph, and a website.

Next, in step S14, a user input is received via the user interface 36 of the first portable device 20 in respect of one of the content item representations 50C, 50D. In response to this, in step S15, the controller 10 of the server apparatus 24 sends a signal to the portable device 20 for causing the device 20 to provide the content item to the user. For example, if the user input is in respect of the representation 50C relating to the photograph, the controller 10 of the first portable device 22 responds to the instruction signal by causing the photograph to be displayed. In some embodiments, the controller 30 of the portable device may perform step S15 without communicating with the server apparatus 24.

Subsequent to step S15, the method returns to step S8

Although not shown in FIG. 4, the controller 10 of the server apparatus 24 is operable to determine when other portable devices are in the same location as the first and second devices 20, 22. Consequently, if a third user, carrying a third portable device, arrives at the same location, the controller 10 is operable to add an information element identifying the third portable device, or the user thereof, to the database entry. The controller 10 may also add to the database entry a timestamp identifying when the third portable device arrived at the location. In some examples, the identifier of the third device may not be included in the database entry until the third device has been in the same current location for longer than a predetermined duration. In response to adding the identifier of the third device to the database entry, the controller 10 may send an instruction signal to the first portable device 20 for causing the portable device 20 to display a graphical representation identifying the third portable device, or a user thereof.

The controller 10 may be operable to determine when the first and second portable devices move together from the first location to the second different location. Once the first and second portable devices have been at the second location for longer than a predetermined duration, the controller 10 may include in the database entry an information element identifying the second location. The controller 10 may cause this information to be sent as part of an instruction signal to the first portable device 20. The instruction signal causes the first portable device 20 to display a graphical representation identifying the second location.

Figure 5C:
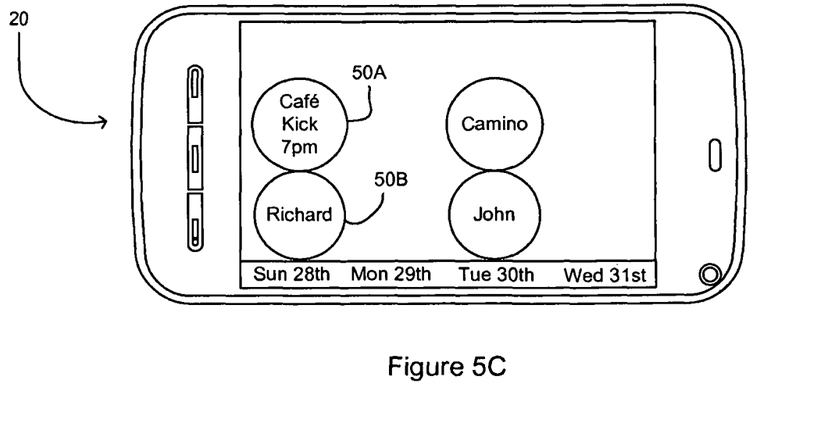

As discussed above, each of the information elements stored in the database entry may have a timestamp associated therewith. These time stamps may be transmitted as part of the instruction signals from the server apparatus 24 to the portable device 20. The graphical representations 50A-50D relating to the information elements may subsequently be caused to be displayed at a location on the display in dependence on the associated timestamp. In this way, the arrangement of graphical representations may appear to flow with time in a particular direction.

The controller 10 is operable to respond to a user input to edit the database entry. For example, the user may use the user interface 36 to select a particular graphical representation 50A-50C for deletion. In response to this, the controller 10 may cause the information element associated with the selected graphical representation to be deleted from the database entry.

The controller 10 is operable to cause graphical representations relating plural different database entries to be displayed simultaneously. The representations may be displayed at a location the display that is dependent on timestamps associated therewith. As such, graphical representations relating to more than one event may be displayed in date order, for example as part of a timeline. FIG. 5C shows graphical representations relating to two different events displayed simultaneously as part of a timeline.

Figure 6:
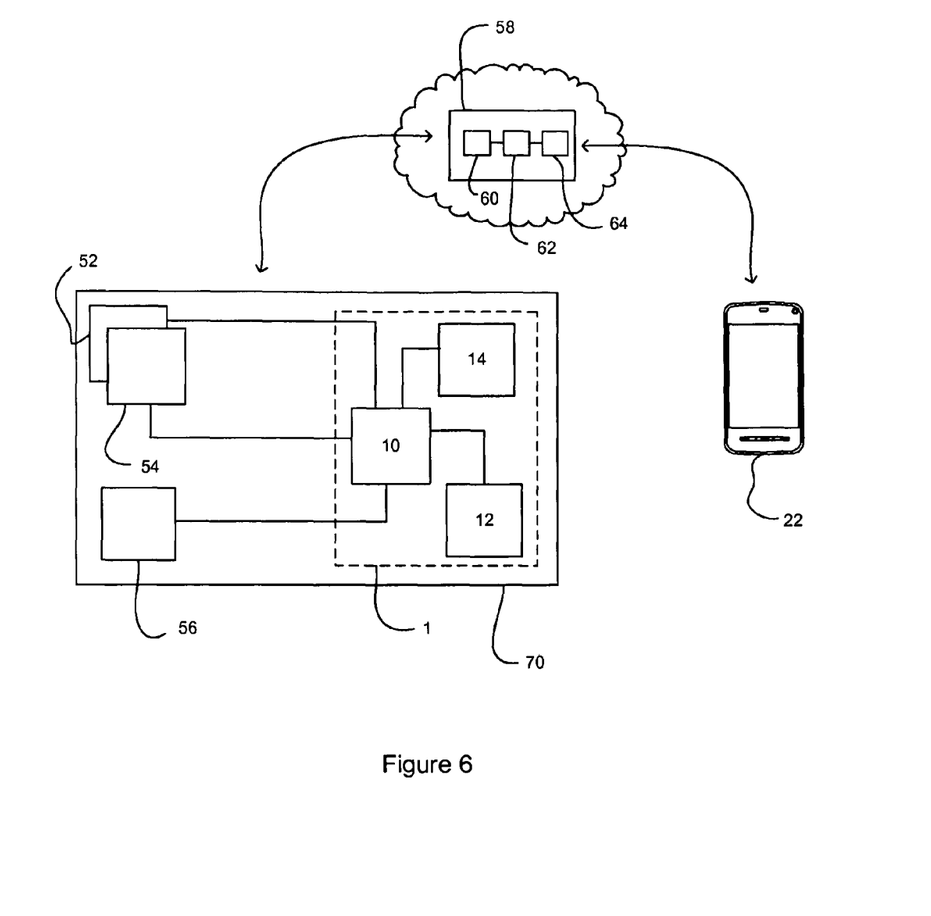
FIG. 6 is a schematic illustration of another example communication system in which apparatus according to example embodiments of the invention may be provided.

In the example embodiments as described with reference to FIG. 4, the method is carried out primarily by a controller 10 in server apparatus 24. It will be appreciated, however, that the method may instead be performed by the apparatus 1 of FIG. 1 provided in a portable device, instead of at a server. A schematic illustration of example embodiments such as this is shown in FIG. 6. The portable device 70 is provided in an example communication system, which also comprises a server 58 located in a network, and a second portable device 22. The portable device 70 comprises the apparatus 1 described with reference to FIG. 1 along with a user interface 54 and a display 52. The device may also comprise a location module 56 such as a GPS module. The server apparatus 58 comprises a transceiver 60 for communicating with the portable devices 70, 22, a controller 62 and a memory 64. The server 58 is operable to transmit, to the portable device 70, location information relating to the location the second portable device 22. The server 58 is operable also to transmit to the portable device 70 information identifying to content items in relation to which an action has been performed by the second portable device 22.

It will be appreciated that different example embodiments of the invention may not comprise all of the steps described in relation to FIG. 4. For example, some example embodiments may not include one or more of steps S4 and S5 and/or steps S11 to S15. It will also be appreciated that the steps of the method are not restricted to the order shown in FIG. 4. For example, in some embodiments, the order of steps S4 and S5 may be reversed. In some examples, the determination of step S5 may be performed prior to step S2.

In some embodiments, the controller 10 of the apparatus 1 may be configured to identify content items based upon the current location. The controller 10 may then cause information relating to the identified content item to be suggested to the user. For example, when the current location is a restaurant, the controller 10 may locate the menu of the restaurant and may cause a notification regarding the menu to be provided to the user of the first device. The user is then able view the menu using the portable device 50. The controller 10 may respond to the user viewing the menu by causing an information element identifying the menu to be stored in the event database entry. Similarly, the controller 10 may be operable to send questions to the user based on the current location. For example, if the location is a restaurant, the controller may determine this and may cause a question, such as "What have you ordered?", to be displayed on the display 34, 54 of the portable device 20, 50. User responses to these questions may then be added to the event database entry.

In some examples, the criterion which must be satisfied for the devices to be determined to be in the same location may be selected by the user of the first device. For example, the user may wish for database entries to be created only when the two devices are in very close proximity (e.g. closer than 2 m apart). As such, entries are less likely to include devices of users with whom the user of the first device is not actually spending time. In other situations, the user may want to know who is in the same bar, park, restaurant etc. even though the user is not spending time with those people. As such, the user may, for example, set the criterion as being that devices are within the range of the same WLAN, picocell or base station service area.

In some examples, the controller 10 may recognise that the two devices are in the same location when it is detected that a short-range interaction, such as a Bluetooth or NFC connection, has occurred, or is occurring, between the first and second portable devices. Detection of such a short-range interaction may cause a timer to be started. Upon expiry of the timer, the controller 10 may determine if the short range interaction is still ongoing and, if so, the controller 10 determines that the devices have been at the same location for longer than the predetermined location. In such examples, steps S1 and S2 may be omitted and an additional step of determining the location of the devices may be carried out subsequent to step S3. In other examples, when the short range interaction is detected, the controller may determine the location of the two devices. Then, subsequent to the expiry of a timer started in response to detection of the short-range interaction, the controller may again determine their location. If the two locations match, then it is determined that the devices have been at the same location longer than the predetermined location. In other examples, the controller may repeatedly determine the location of the devices while the timer is running. In these examples, steps S1 and S2 may be omitted. As described above, the duration of the timer may comprise any suitable interval, for example 5, 10, 15 or 30 minutes.

In some examples, the determination that the devices are in the same location may be made in response to determining that both devices are receiving location based services. For example, if both devices receive location based "push-advertisements" (for example, because both devices have entered a shopping centre), it may be recognised that the devices are in the location. There may an additional criterion that the devices must both receive the location based services within a predetermined duration, such as but not limited to 5 or 10 minutes. Other examples of location based services include services from "smart surfaces". Smart surfaces are such that when a user puts their device on or near the smart surface, information associated with the smart surface is transmitted (or pushed) to their device. In some of these examples, steps S1 and S2 may be omitted. In these examples, an additional step of determining the location of the devices may be included after step S3. In other examples, the location of one of the devices may be determined by repeatedly monitoring the device's position (as in step S1 or S2) and the location of the other device may be determined based on location specific services received by that device.

In these service-based and short-range interaction-based embodiments, any information or content received via the service or exchanged via the short-range interaction may be stored in association with the new event database entry. In the service-based embodiments, however, the information may only be stored if the user views or utilises the information received via the service.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   determining when a first portable device and a second portable device have been at a same current location for longer than a predetermined duration; and
   only if it is determined that the first and second portable devices have been at the same current location for longer than the predetermined duration, creating a database entry associated with the first portable device, the database entry including information identifying the second portable device.

2. The method of claim 1, wherein the database entry includes information identifying the same current location.

3. The method of claim 1 comprising causing a graphical representation of at least part of information in the database entry to be displayed on a display of the first portable device.

4. The method of claim 3, wherein the graphical representation comprises a link to a content item associated with the information with which the representation is associated, and wherein the method comprises:
responding to user selection, via the first portable device, of the link by causing the content item to be provided to the user of the first portable device.

5. The method of claim 1 comprising, while the first and second portable devices remain at the same location, obtaining information relating to one or more content items associated with the current location and including information identifying the one or more content items in the database entry.

6. The method of claim 1, comprising determining a current date and associating the database entry with the current date.

7. The method of claim 1 comprising:
   prior to creating the database entry, determining, based on an identifier associated with the second portable device and one or more reference device identifiers, whether or not the database entry is to be created; and
   creating the database entry only in response to a positive determination.

8. The method of claim 1 comprising:
   prior to creating the database entry, determining, based on an identifier associated with the same current location and one or more reference location identifiers, whether or not the database entry is to be created; and
   creating the database entry only in response to a positive determination.

9. The method of claim 1 comprising:
   determining that the first and second portable devices have been at the same location for longer than the predetermined duration by repeatedly determining a current location of a first portable device and
   repeatedly determining a current location of a second portable device.

10. The method of claim 1, further comprising receiving selection by a user of a criterion which must be satisfied for the devices to be determined to be in the same location.

11. The method of claim 1, wherein the database entry includes a timestamp identifying a time at which the first and second devices are at the same location.

12. The method of claim 1, wherein the predetermined duration is suitable to prevent devices being detected as being in the same current location when having been at the same current location is only transitory.

13. An apparatus comprising:
   at least one processor; and
   at least one memory having computer-readable instructions stored thereon, the computer-readable instructions, when executed by the at least one processor, causing the apparatus:
   to determine when a first portable device and a second portable device have been at a same current location for longer than a predetermined duration, and only if it is determined that the first and second portable devices have been at the same current location for longer than the predetermined duration, to create a database entry associated with the first portable device, the database entry including information identifying the second portable device.

14. The apparatus of claim 13, wherein the database entry includes information identifying the same current location.

15. The apparatus of claim 13, wherein the computer-readable instructions cause the apparatus:
   to cause a graphical representation of at least part of information in the database entry to be displayed on a display of the first portable device.

16. The apparatus of claim 15, wherein the graphical representation comprises a link to a content item associated with the information with which the representation is associated, and wherein the computer-readable instructions cause apparatus:

to be responsive to user selection, via the first portable device, of the link to cause the content item to be provided to the user of the first portable device.

17. The apparatus of claim 13, wherein the computer-readable instructions cause the apparatus, while the first and second portable devices remain at the same location:

to obtain information relating to one or more content items associated with the current location; and to include information identifying the one or more content items in the database entry.

18. The apparatus of claim 13, wherein the computer-readable instructions cause the apparatus:

to determine a current date and associating the database entry with the current date.

19. The apparatus of claim 13, wherein the computer-readable instructions cause the apparatus:

prior to creating the database entry, to determine, based on an identifier associated with the second portable device and one or more reference device identifiers, whether or not the database entry is to be created; and to create the database entry only in response to a positive determination.

20. The apparatus of claim 13, wherein the computer-readable instructions cause the apparatus:

prior to creating the database entry, to determine, based on an identifier associated with the same current location and one or more reference location identifiers, whether or not the database entry is to be created; and to create the database entry only in response to a positive determination.

21. The apparatus of claim 13, wherein the computer-readable instructions cause the apparatus:

to determine repeatedly a current location of a first portable device and to determine repeatedly a current location of a second portable device and thereby to determine that the first and second portable devices have been at the same location for longer than the predetermined duration.

22. The apparatus of claim 13, wherein the computer-readable instructions, when executed by the at least one processor, further cause the apparatus to receive selection by a user of a criterion which must be satisfied for the devices to be determined to be in the same location.

23. The apparatus of claim 13, wherein the database entry includes a timestamp identifying a time at which the first and second devices are at the same location.

24. The apparatus of claim 13, wherein the predetermined duration is suitable to prevent devices being detected as being in the same current location when having been at the same current location is only transitory.

25. A non-transitory computer-readable medium having computer-readable instructions stored thereon, the computer-readable instructions, when executed by at least one processor, causing an apparatus:

to determine when a first portable device and a second portable device have been at a same current location for longer than a predetermined duration, and only if it is determined that the first and second portable devices have been at the same current location for longer than the predetermined duration, to create a database entry associated with the first portable device, the database entry including information identifying the second portable device.

26. The non-transitory computer-readable medium of claim 25, wherein the computer-readable instructions, when executed by the at least one processor, further cause the apparatus to receive selection by a user of a criterion which must be satisfied for the devices to be determined to be in the same location.

27. The non-transitory computer-readable medium of claim 25, wherein the database entry includes a timestamp identifying a time at which the first and second devices are at the same location.

28. The non-transitory computer-readable medium of claim 25, wherein the predetermined duration is suitable to prevent devices being detected as being in the same current location when having been at the same current location is only transitory.

* * * * *